United States Patent
Hacigumus et al.

(10) Patent No.: US 9,477,708 B2
(45) Date of Patent: Oct. 25, 2016

(54) SYSTEM FOR MULTI-STORE ANALYTICS EXECUTION ENVIRONMENTS WITH STORAGE CONSTRAINTS

(71) Applicant: NEC Laboratories America, Inc., Princeton, NJ (US)

(72) Inventors: Vahit Hakan Hacigumus, San Jose, CA (US); Jagan Sankaranarayanan, Santa Clara, CA (US); Jeffrey Paul LeFevre, Santa Cruz, CA (US); Junichi Tatemura, Cupertino, CA (US); Neoklis Polyzotis, Santa Cruz, CA (US)

(73) Assignee: NEC Corporation (JP)

( * ) Notice: Subject to any disclaimer, the term of this patent is extended or adjusted under 35 U.S.C. 154(b) by 301 days.

(21) Appl. No.: 14/073,782

(22) Filed: Nov. 6, 2013

(65) Prior Publication Data
US 2014/0207755 A1  Jul. 24, 2014

Related U.S. Application Data

(60) Provisional application No. 61/727,895, filed on Nov. 19, 2012.

(51) Int. Cl.
*G06F 17/30* (2006.01)

(52) U.S. Cl.
CPC .............................. *G06F 17/30463* (2013.01)

(58) Field of Classification Search
CPC .................................................. G06F 17/30463
See application file for complete search history.

(56) References Cited

U.S. PATENT DOCUMENTS

| | | | |
|---|---|---|---|
| 6,339,769 B1* | 1/2002 | Cochrane | G06F 17/30457 |
| 7,984,043 B1* | 7/2011 | Waas | G06F 17/30932 707/718 |
| 2007/0083500 A1* | 4/2007 | Zibitsker | G06F 9/5083 |
| 2009/0177697 A1* | 7/2009 | Gao | G06F 17/30545 |

* cited by examiner

*Primary Examiner* — Kris Mackes
(74) *Attorney, Agent, or Firm* — Joseph Kolodka

(57) ABSTRACT

Systems and methods are disclosed for managing a multi-store execution environment by applying opportunistic materialized views to improve workload performance and executing a plan on multiple database engines to increase query processing speed by leveraging unique capabilities of each engine by enabling stages of a query to execute on multiple engines, and by moving materialized views across engines.

15 Claims, 5 Drawing Sheets

SYSTEM FOR MULTI-STORE ANALYTICS EXECUTION ENVIRONMENTS WITH STORAGE CONSTRAINTS

This application is a utility conversion and claims priority to Provisional Application Ser. 61/727,895 filed Nov. 19, 2012, the content of which is incorporated by reference.

BACKGROUND

The present system relates to Multi-store Analytics Execution Environments with Storage Constraints.

A database stores information as records, and records are stored within data pages on disk. The physical design of a database refers to the configurable physical data layout and auxiliary data structures, such as indexes and materialized views. The physical design can greatly affect database processing speed, and designs are tuned to improve query performance. The physical design tuning problem can be stated informally as: "Given a workload W and storage budget b, obtain a physical design that minimizes the cost to evaluate W and fits within b". W is a workload that may contain query and update statements. The storage budget is the storage space allotted for the physical design. Physical designs can include secondary data structures to enable faster data access such as indexes and materialized views, and may also include data partitioning strategies that affect the physical data layout. Commercial tools to automate this process exist in major DBMS such as IBM DB2's Design Advisor] and MS SQL Index Tuning Wizard that recommend beneficial physical designs.

In "Optimizing analytic data flows for multiple execution engines", a single data flow is optimized across multiple execution engines by utilizing their unique performance capabilities to reduce total execution time of the flow. Input data is 'pinned' to a store, i.e., where it currently resides, and output data is pinned to the DW as a reporting requirement. They consider data shipping and function shipping, and these decisions are affected by the availability of data and functions on each of the engines. Data movement cost is modeled as the network cost. To solve the problem they model it as a state space using a binary-valued matrix. Each row represents an operation in a data flow (in sequence) and each column represents an execution engine. A '1' is used to indicate if an operation is available on an engine, and zero if the operation is not available. They enumerate all valid paths top-down through the matrix. Valid moves in creating a path are allowed straight down or diagonal, but not allowed to move through a '0' cell. After enumerating all valid paths, they prune extensively to eliminate non-preferred paths, based on their desired heuristics. Heuristics include 1) prefer a certain engine (favor bit) for a flow, 2) disallow too many data movements between engines, 3) prefer engines that have more of the functions required for a data flow (considering functionality is not identical on all stores), and several other heuristics. They also require all flows to terminate in the DW. However, this approach does not provide a direct solution for our problem because it only considers optimizing for a single flow (query). Our proposed work will optimize for a workload of queries. We will leverage multiple engines by allowing opportunistic views to be moved between stores during query processing if moving the view will reduce total workload cost. Since their solution consider only a single query, it can be sub-optimal when considering multiple queries. A straightforward example of why their solution can be sub-optimal is the following. Consider optimizing a single query, and a decision is made not to move a materialized view from engine A to engine B due to the cost of movement being too high for the single query to benefit. However, if it had considered all queries in the workload, moving the view could result in great benefit to other queries, potentially outweighing the data movement cost.

SUMMARY

Systems and methods are disclosed for managing a multi-store execution environment by applying opportunistic materialized views to improve workload performance and executing a plan on multiple database engines to increase query processing speed by leveraging unique capabilities of each engine by enabling stages of a query to execute on multiple engines, and by moving materialized views across engines.

Advantages of the preferred embodiment may include one or more of the following. The system can move any view to any engine without requiring a very large search space for engine designs. A choice to move an individual view affects the benefit of all future queries in a sequence. Furthermore, since views can have interactions, these benefits are determined in light of other views. The space of views to move is not fixed but is always changing, as it depends upon the opportunistic views created by the last plan to execute. The multi-store execution problem makes the correct view movement choices during execution of the workload sequence. A optimal solution may be impractical due to the exponential space. Because a globally optimal solution may not be practical, we can use a local solution.

DESCRIPTION

Figure 1:
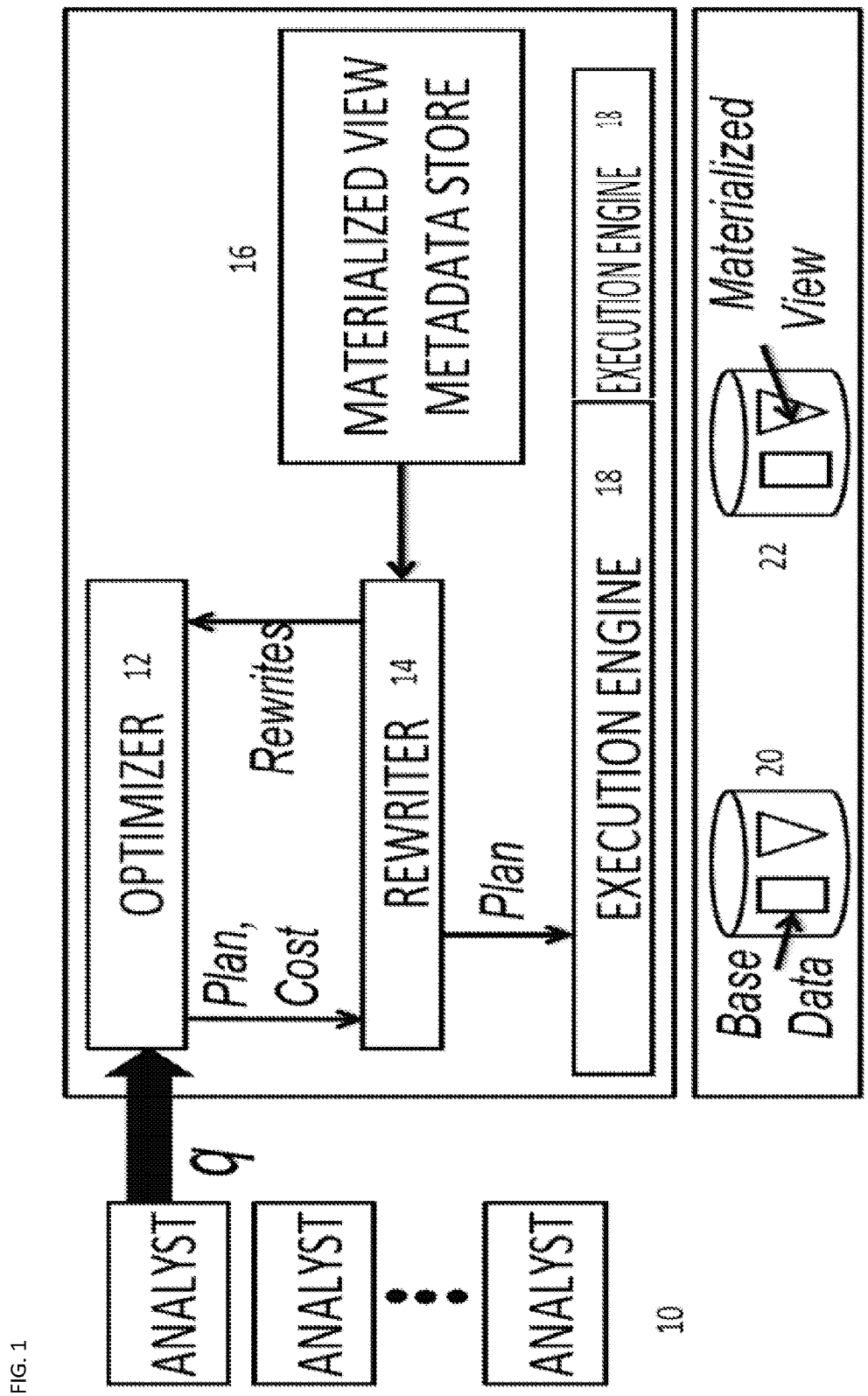
FIG. 1 shows an exemplary multi-store environment with multiple engines.

FIG. 1 shows an exemplary high level overview of a system framework showing control flows executing on multiple database engines. The system supports these three dimensions through rewriting workflows to be more efficient by using answers materialized as part of previous workflow execution runs in the system. The system integrates a query rewriting component with an existing query execution engine that is used by analysts 10. An optimizer 12 takes a query written in some declarative language and translates it into an execution plan that consists of MR jobs. Queries are expressed against the base data, which are large logs and queries contain UDFs. Each MR job materializes its output to the stable storage (e.g., HDFS in Hadoop). In this embodiment, the optimizer can provide cost estimates for UDFs admitted to the system. The target execution engine is extended by integrating a rewriter 14, as well as a materialized view metadata store 16. The rewriter 14 communicates a plan to a plurality of execution engines 18. To let the rewriter 14 communicate with the optimizer of the target engine, the optimizer 12 is extended to generate a plan with two types of annotations on each plan node: (1) a logical expression of its computation and (2) an estimated execution cost. The rewriter uses the logical expression in the annotation when searching for rewrites for the output of a node. The expression consists of relational operators or UDFs. For each rewrite found during the search, the rewriter utilizes the optimizer to obtain a plan and estimated cost. During query execution, all by-products of query processing are retained as opportunistic materialized views, and stored in the system becoming part of its opportunistic physical design configuration. The materialized view metadata store contains information about the materialized views currently in the system such as the view definitions, and standard data statistics used in query optimization.

We can obtain the cost of a statement q in workload W using the database optimizer. The cost to evaluate q under a design D is given by cost(q,D), which corresponds to the cost of the plan chosen by the query optimizer. In a modern DBMS, the "what-if optimizer" interface can be used to obtain a cost estimate of a statement given a hypothetical design D. This is convenient because this cost estimate can be obtained without actually materializing the design (i.e., indexes and materialized views).

An opportunistic design for multiple data stores is discussed next. The system leverages the execution characteristics of different database management systems available in database-as-a-service (DaaS). Systems such as a data warehouse, column-store, and MapReduce may excel at different query processing tasks. We leverage these capabilities by allowing a single query to access multiple database engines for processing. Each query may produce opportunistic views, and these views may be created on different systems depending on where query processing occurs. For each view materialized on some system, we will also consider transferring it among all systems. The intent of moving a view from one system to another is to make it available to queries that can benefit from a system's processing capabilities. In this way, these views will now become part of the opportunistic physical design of multiple systems.

We will refer to the multiple data management systems as execution engines. Each engine represents a unique data management system, e.g, RDBMS, Hadoop, Column-store, data warehouse (DW). Base data may be stored in any engine, and each engine has the capability to execute a class of queries. We denote the set of execution engines as $E=\{E_1, E_2, \ldots, E_m\}$. Each engine has a set of views that we call an engine's design D. We define a multi-store configuration D, $D=\{D_1, D_2, \ldots, D_m\}$, where $D_i$ represents the design of engine $E_i$. We use V to denote the universe of all possible views. We define a workload Q as a sequence of queries $\langle q_1, q_2, \ldots, q_n \rangle$.

Each query has a multi-store execution plan P. A plan P may have multiple stages, where each stage represents some computation performed for a query. We define a stage s∈P as a materialization point in the physical plan, i.e., produces an opportunistic view. Then, a multi-store execution plan P is defined in the following way:

$$P=(G,f,t) \quad (1)$$

Where G represents the DAG for a plan, and is ordered topologically. A vertex in G corresponds to a stage s in a plan P. An edge in G corresponds to communication between two stages in a plan. This represents an opportunity to move the execution of the next stage to a different engine, and also to move views across engines. $f:P \mapsto E$ is a mapping function that maps a stage in P to an execution engine in E. $t:V \mapsto E$ is a transfer function that indicates transfer of views in V to an engine in E. Under our assumptions, a stage s∈P may be executed on any engine.

Each query in Q has a corresponding multi-store execution plan P, and $P_i$ represents the multi-store execution plan for query $q_i$. The execution of a plan $P_i$ results in a new multi-store configuration, which includes all of the opportunistic views created by the execution stages of plan $P_i$ on engines in E, and the transfer (copying) of those views to engines in E during the execution of the plan.

We define a function opviews (s,e) that returns the set of opportunistic views created by executing a stage s on the engine e∈E. Let the inputDesign(s,D) represent the design of an engine at the start of a stage s∈P. This design has three components, 1) the original design of the engine before P (as determined by D), 2) all opportunistic views that have been transferred to the engine prior to stage s (as determined by t), and 3) all opportunistic views that have been created on the engine prior to stage s (as determined by $f$). We define a function prev(s,$f$(s)) that returns the previous stage that executed on the engine determined by the mapping function, $f$(s).

Then the inputDesign(s,D) is defined in the following way:

$$inputDesign(s, D) = \{v: \exists s' \in G, v \in t(s', s), (s' < s), (f(s') = f(s))\} \cup D_{f(s)} \cup outputDesign(prev(s, f(s)), D)$$

Where the outputDesign(s,D) is the union of the inputDesign(s,D) and all opportunistic views created by the engine executing stage s, and is defined in the following way:

$$outputDesign(s,D)=inputDesign(s,D) \cup opviews(s,f(s)) \quad (2)$$

We also need to represent the multi-store configuration before executing a plan $P_i$. Because the design of all engines can change after execution a plan, we require a way to obtain the current multi-store configuration D before a plan is executed. The multi-store configuration created after executing all plans prior to $P_i$ is given by:

$$inputDesign(P_i, D) = \begin{cases} D & , i=1 \\ outputDesign(P_{i-1}, inputDesign(P_{i-1},D)) & , \text{otherwise} \end{cases}$$

Where outputDesign(P,D)=outputDesign(s',D), where s' is the last stage of P.

The cost of executing a stage can be obtained by using the query optimizer of the engine the stage is mapped to by the mapping function $f$. This cost is dependent on the execution characteristics of the engine for the stage s, as well as the current design of the engine. We use cost(q,e,D) to denote the cost of executing a query q at engine e with physical design D. The cost of executing a stage on an engine is given by:

$$cost(s,f(s),inputDesign(s,D)) \quad (3)$$

There is a cost to transfer a view from one engine to another. This includes the network cost and dump/load cost from/to an engine. These costs are not identical for all engines. We use tcost(v,e,e') to denote the cost of transferring a view v from engine e∈E to engine e'∈E. We can use the system to obtain this cost. The cost to transfer a view is given by:

$$tcost(v,f(s_a),f(s_b)) \quad (4)$$

Now that we have defined the cost to execute a stage and the cost to transfer a view, we can present the cost of a multi-store plan. Informally, the cost for a plan P given a multi-store design D is the cost to execute all of its stages in on some engine given that engine's current design at each stage, and the cost to transfer the opportunistic views created by each stage to some engine in E. More formally, the cost for a plan P given a multistore configuration D is given by Equation 5.

$$\text{cost}(P, D) = \sum_{s \in G} \text{cost}(s, f(s)\text{inputDesign}(s)) + \sum_{\substack{(s_a, s_b) \\ \in G}} \sum_{\substack{v \in \\ t(s_a, s_b)}} \text{tcost}(v, f(s_a), f(s_b)) \quad (5)$$

Multi-store execution problem is discussed next. At a high level, we are given a query workload, a set of execution engines E, and a multi-store configuration D, and a multi-store execution solution is sequence P of plans that results in a low total execution cost for the workload using engines in E. This requires choosing where to execute the stages of each query and which views to transfer among engines. A good solution should not just optimize each query individually, but rather consider transferring views that are beneficial for subsequent queries such that the total cost to execute all queries is reduced.

Given as input a sequence of queries, $\langle q_1, q_2, \ldots, q_n \rangle$, and a multi-store design D, output a sequence of multi-store execution plans $\langle P_1, P_2, \ldots, P_n \rangle$ that minimizes the cost of executing the input query sequence.

The objective function is:

$$\text{minimize} \sum_i \text{cost}(P_i, \text{inputDesign}(P_i, D)) \quad (6)$$

The system of FIG. 1 increases query processing speed by leveraging the unique capabilities of each engine by enabling stages of a query to execute on multiple engines 18, as well as moving materialized views across engines. We move views across engines by piggybacking moves along the query execution path. The movement of views alters the physical design of each engine. We formulate the problem as a minimization of the execution time of a sequence of queries by creating beneficial physical designs through the movement of views during stages of query execution.

Figure 2:
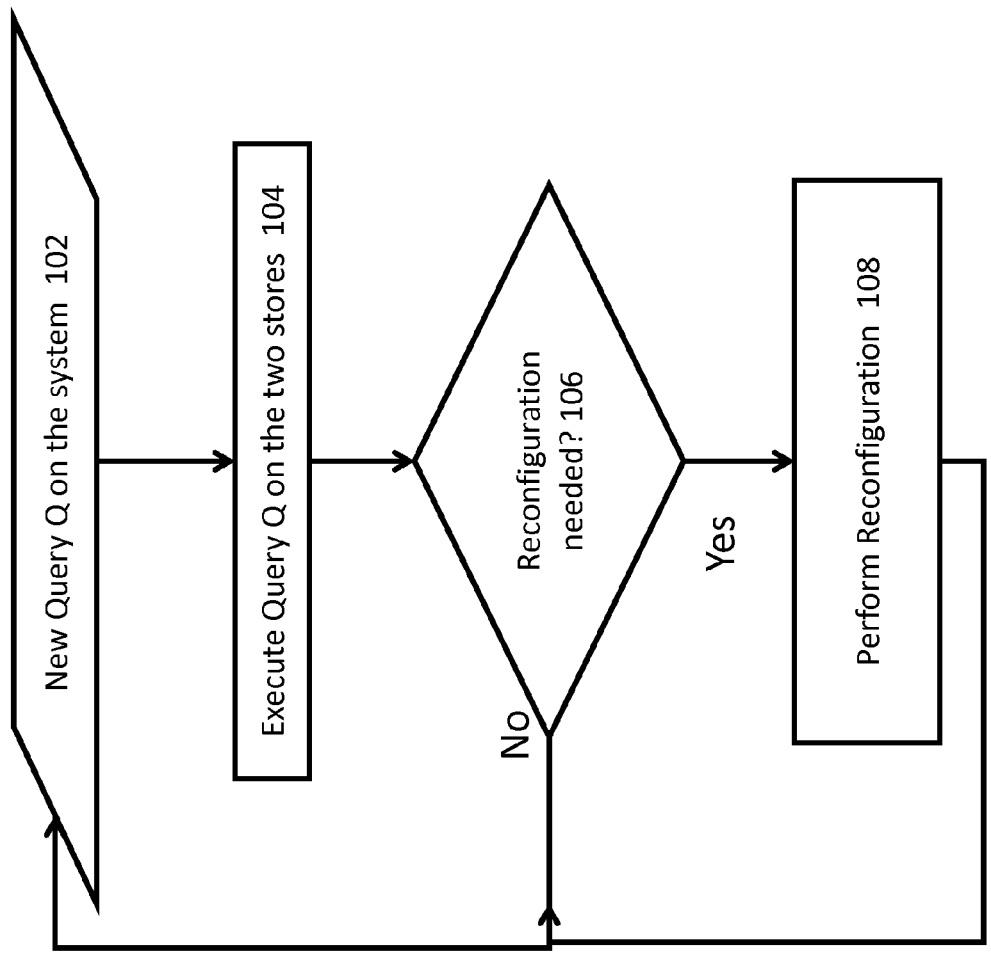
FIGS. 2-4 show exemplary processes supporting Multi-store Analytics Execution Environments with Storage Constraints.

FIG. 2 shows an exemplary process for reconfiguring a database. A new query Q is received by the system (102). The query Q is executed on the two stores (104). The process checks if reconfiguration is needed (106). If not, the process loops back to 102 and otherwise reconfiguration is performed (108), and the process loops back to 102.

Figure 3:
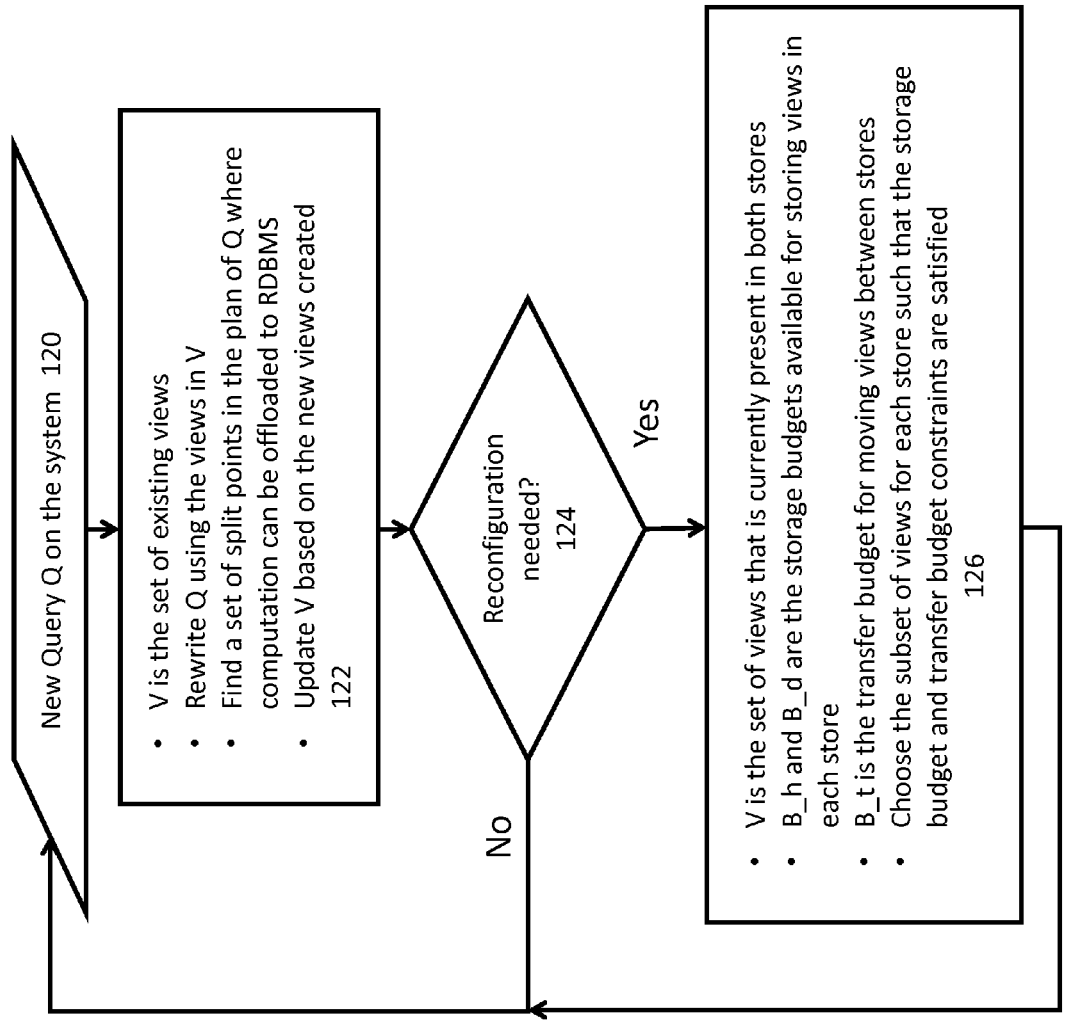

FIG. 3 shows an exemplary process for managing storage and transfer budget constraints. A new query Q is received by the system (120). The query Q is rewritten using the views in V, the set of existing views. A set of split points are located in the plan of Q where computations can be offloaded to RDBMS, and V is updated based on the new views (122). The process determines if reconfiguration is needed (124). If not the process loops to 120 and alternatively the process performs budget management (126). In V is the set of views currently present in both stores, B_h and B_d are the storage budgets available for storing views in each store. B_t is the transfer budget for moving views between stores. The process chooses the subset of views for each store such that the storage budget and transfer budget constraints are satisfied in 126.

Figure 4:
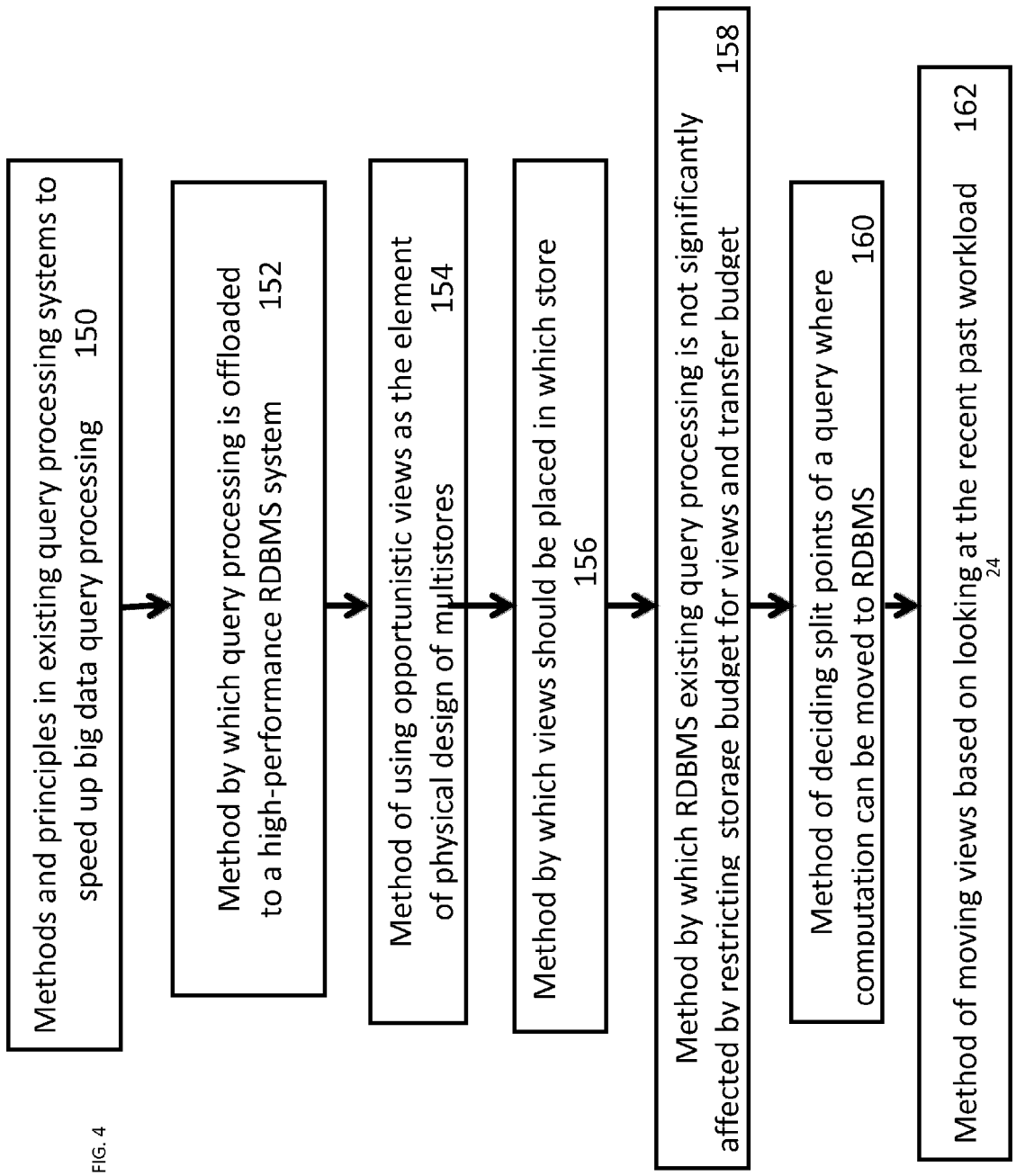

FIG. 4 shows an exemplary process for supporting Multi-store Analytics Execution Environments with Storage Constraints. The process includes methods and principles in existing query processing systems to speed up big data query processing 150, method by which query processing is offloaded to a high-performance RDBMS system 152, method of using opportunistic views as the element of physical design of multistores 154, method by which views should be placed in which store 156, method by which RDBMS existing query processing is not significantly affected by restricting storage budget for views and transfer budget 158, method of deciding split points of a query where computation can be moved to RDBMS 160, and method of moving views based on looking at the past recent past workload 162.

We find a sequence of output plans that minimizes the total cost of executing all queries. Given as input a set of queries, $\{q_1, q_2, \ldots, q_n\}$, and a multi-store configuration D, the system can determine a sequence of multi-store execution plans $\langle M_1, M_2, \ldots, M_n \rangle$ that minimizes the cost of executing all queries. In determining this sequence, M can be all permutations of plans for the input queries. Let $M^j$ be a sequence that represents a single permutation of plans, $\forall j \in [1, n!]$. Then let sequencecost($M^j$) represent the cost of the plan sequence $M^j$ that is optimized using the objective function in Equation 6. Then we want to find the sequence that has the least cost to execute, which is defined by:

$$\text{argmin}_{M^j \in M} \text{sequencecost}(M^j) \quad (7)$$

One approach will consider optimizing for a sliding window of m queries. When considering a view movement, instead of computing the benefit for all future queries given each view movement choice, we can restrict the benefit computations to a sequence of the next m queries, where m<n. This reduces the solution space by considering a shorter sequence of queries.

For a sliding window approach, we can consider sliding windows that are disjoint or overlapping. A sliding window approach will solve the problem for the current window of queries, then move to the next window. The output of the window approach will be all view movements for the next m queries.

With disjoint windows, the window will slide by m queries. The next window will begin with query at position m+1 in the sequence. Disjoint windows will not have visibility to queries in the next window, potentially making decisions that are sub-optimal for queries in the next window. With disjoint windows, decisions made during one window will never be revisited. This approach leads to completely disjoint local optimizations.

Overlapping windows would still provide local solutions, but will allow us to revisit local decisions. All views moved during the previous window will appear in the inputDesign (s,D) for a query stage in the next (overlapped) window. This approach is still sub-optimal but prevents completely disjoint local optimizations.

We can also take view interactions into account when considering the cost of moving a view. If two views have a positive interaction for queries in the window, of course they should be moved together and the cost must include moving both views. If two views have a negative interaction for queries in the window, then we only need consider moving the view with the most benefit. There are some complications to this since our local approach will not be able to consider these interactions beyond the sliding window of queries. By considering the local window only, this reduces the number of interactions we need to compute as compared to a global window. Using interactions can help us to prune the number of views considered for moving.

Given a set of candidate indexes that are beneficial to the workload, at each stage in the sequence they prune from consideration all configurations that include indexes that are not relevant to the query at that stage. Intuitively, there is no reason to consider a configuration that includes an index for a query if the query does not benefit from the index. This method is still very expensive, but we can compare solutions from our approach to this method as a way to evaluate our solution quality.

Figure 5:
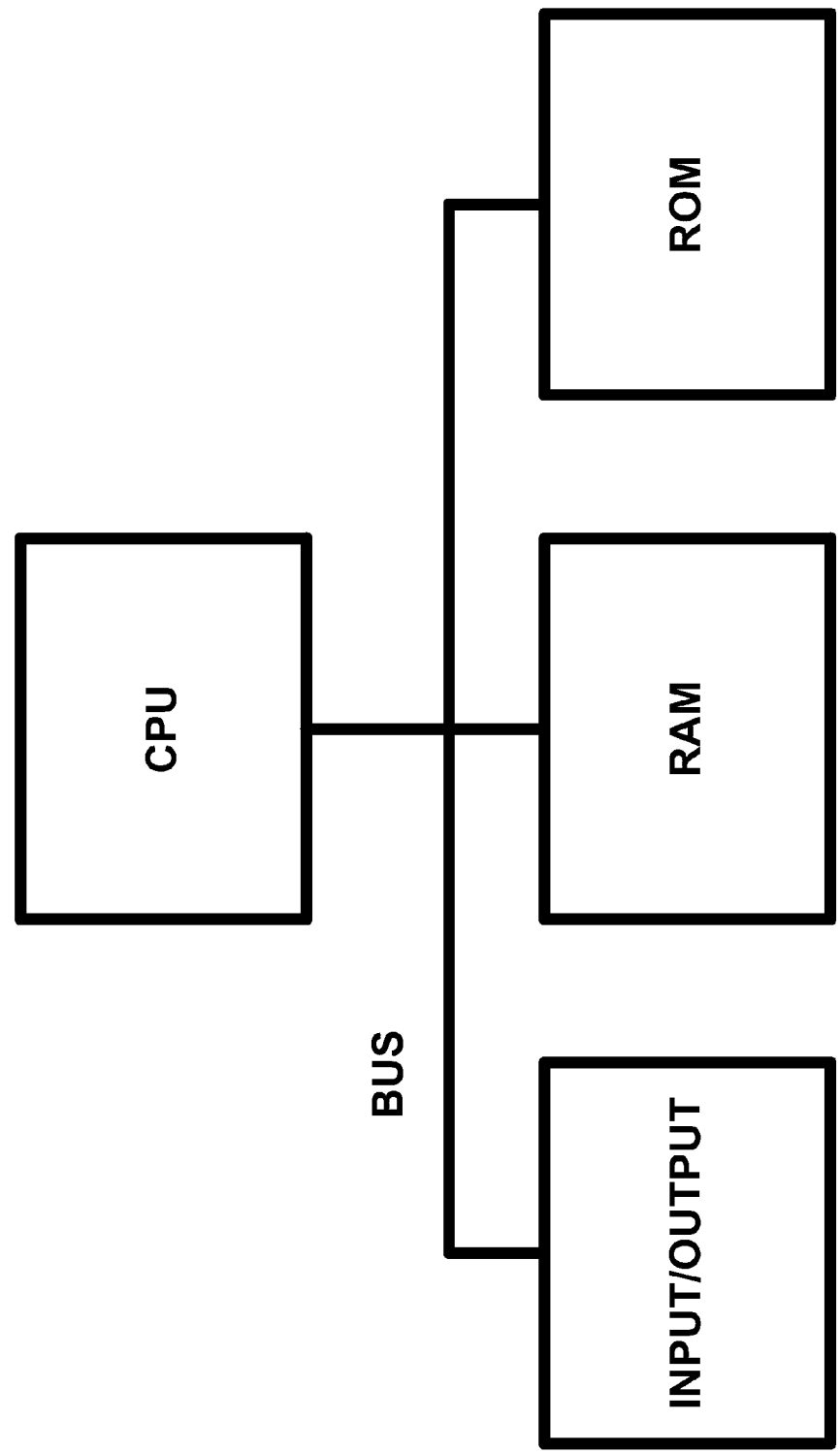
FIG. 5 shows an exemplary computer for the processes of FIGS. 2-4.

The invention may be implemented in hardware, firmware or software, or a combination of the three. FIG. 5 shows an exemplary computer to execute object detection. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for managing an execution environment, comprising:

applying opportunistic materialized views;

executing a plan on multiple database engines to increase query processing speed by enabling stages of a query to execute on multiple engines, and by moving materialized views across engines;

determining a multi-store execution plan P, as:

$$P=(G,f,t)$$

where G represents a directed acyclic graph (DAG) for a plan, and is ordered topologically with a vertex in G corresponding to a stage s in plan P, $f:P \mapsto E$ is a mapping function that maps a stage in P to an execution engine in E, $t:V \mapsto E$ is a transfer function that indicates transfer of views in V to an engine in E, and a stage $s \in P$ may be executed on any engine; and determining a multi-store configuration created after executing all plans prior to $P_i$ by:

$$inputDesign(P_i, D) = \begin{cases} D & , i=1 \\ outputDesign(P_{i-1}, inputDesign(P_{i-1},D)) & , \text{otherwise} \end{cases}$$

where outputDesign(P,D)=outputDesign(s',D), where s' is the last stage of P.

2. The method of claim 1, comprising moving views across engines by piggybacking moves along a query execution path.

3. The method of claim 1, comprising minimizing an execution time of a sequence of queries by creating beneficial physical designs through the movement of views during stages of query execution.

4. The method of claim 1, comprising selecting subset of views for each store such that a storage budget and a transfer budget constraints are satisfied.

5. The method of claim 1, comprising retaining opportunistic views from previous versions of the query for future versions of the query.

6. The method of claim 1, comprising generating a sequence of multi-store execution plans P1, P2, . . . , Pn that minimizes a cost of executing an input query sequence.

7. The method of claim 6, comprising ensuring a predetermined set of views are moved to a correct engine early during workload processing.

8. The method of claim 6, comprising minimizing the cost of the workload sequence by moving views at a predetermined time in the sequence.

9. The method of claim 6, comprising identifying a sequence that provides the opportunity to move views at a predetermined time.

10. The method of claim 1, comprising benefit computations to a sequence of the next m queries, rather than all remaining queries to optimize locally using a sliding window over a future query sequence.

11. The method of claim 1, comprising determining:

$$inputDesign(s, D) = \{v: \exists s' \in G, v \in t(s', s), (s' < s), (f(s') = f(s))\} \overset{D_{f(s)}}{\cup} \cup outputDesign(prev(s, f(s)), D);$$

where outputDesign(s,D) is a union of inputDesign(s,D) and all opportunistic views created by the engine executing stage s, and is defined as follows:

outputDesign(s,D)=
  inputDesign(s,D)∪opviews(s,f(s)).

12. The method of claim 1, comprising determining a cost of executing a stage on an engine as:

cost(s,f(s),inputDesign(s,D)).

13. The method of claim 1, comprising determining a cost to transfer a view is given by:

tcost(v,f($s_a$),f($s_b$)).

14. The method of claim 1, comprising determining a cost for a plan P given a multistore configuration D as:

$$cost(P, D) = \sum_{s \in G} cost(s, f(s), inputDesign(s)) + \sum_{\substack{(s_a, s_b) \\ \in G}} \sum_{\substack{v \in \\ t(s_a, s_b)}} tcost(v, f(s_a), f(s_b)).$$

15. The method of claim 1, comprising optimizing an objective function given as input a sequence of queries ⟨$q_1$, $q_2$, . . . , $q_n$⟩ and a multi-store design D, generating a sequence of multi-store execution plans ⟨$P_1$, $P_2$, . . . , $P_n$⟩ that minimizes the cost of executing the input query sequence with objective function as:

$$\text{minimize} \sum_i cost(P_i, inputDesign(P_i, D)).$$

* * * * *